(12) United States Patent
Paatero

(10) Patent No.: US 7,107,616 B2
(45) Date of Patent: Sep. 12, 2006

(54) METHOD OF PRODUCING A RESPONSE

(75) Inventor: Lauri Paatero, Helsinki (FI)

(73) Assignee: Setec Oy, Vantaa (FI)

(*) Notice: Subject to any disclaimer, the term of this patent is extended or adjusted under 35 U.S.C. 154(b) by 691 days.

(21) Appl. No.: 10/047,193

(22) Filed: Jan. 15, 2002

(65) Prior Publication Data

US 2002/0095575 A1    Jul. 18, 2002

Related U.S. Application Data

(63) Continuation of application No. PCT/FI00/00649, filed on Jul. 14, 2000.

(30) Foreign Application Priority Data

Jul. 16, 1999    (FI) ..................... 991617

(51) Int. Cl.
*H04L 9/32*    (2006.01)
(52) U.S. Cl. ............... 726/20; 726/9; 713/159; 713/172; 713/179; 705/65; 705/67; 705/71; 705/72; 380/281; 380/282; 902/26
(58) Field of Classification Search .......... 713/155, 713/159, 172, 174, 15, 179; 380/281, 282; 705/65, 67, 71, 72; 726/9, 20; 902/26
See application file for complete search history.

(56) References Cited

U.S. PATENT DOCUMENTS 4,234,932 A * 11/1980 Gorgens .............. 235/379
4,799,258 A    1/1989 Davies
5,546,463 A    8/1996 Caputo
5,604,801 A * 2/1997 Dolan et al. ............ 713/159

FOREIGN PATENT DOCUMENTS

WO    WO 99/35782 A1    7/1999

OTHER PUBLICATIONS

Messerges et al., "Investigations of Power Analysis Attacks on Smartcards", *USENIX Workshop on Smartcard Technology*, pp. 151-161, (1999).
Kocher et al., "Differential Power Analysis", *Advances in Cryptology*, pp. 388-397, (1999).

* cited by examiner

*Primary Examiner*—Emmanuel L. Moise
*Assistant Examiner*—Paul E. Callahan
(74) *Attorney, Agent, or Firm*—Akin Gump Strauss Hauer & Feld, LLP

(57) ABSTRACT

The present invention relates to a device (1) comprising an input for receiving an input; calculation means (P) for producing a response (OUTPUT) in response to the input (INPUT) and a secret key (A) by utilizing a first predetermined function (f), and an output (3) for feeding said response (OUTPUT) further. In order for an attacker not be able to find out the secret key, the device further comprises a memory (M) in which the key-specific number (RND) is stored, and means for retrieving the key-specific number (RND) from the memory (M) and for feeding it to the calculation means (P') for carrying out predetermined calculation operations (f2) on the basis of the key-specific number (RND) when producing said response (OUTPUT).

8 Claims, 3 Drawing Sheets

METHOD OF PRODUCING A RESPONSE

CROSS-REFERENCE TO RELATED APPLICATIONS

This application is a continuation of International Application No. PCT/FI00/00649, filed Jul. 14, 2000, which was published in the English language on Jan. 25, 2001, under International Publication No. WO 01/06700, and the disclosure of which is incorporated herein by reference.

BACKGROUND OF THE INVENTION

The present invention relates primarily to authentication devices for authenticating for example a smart card or a similar device based on a secret key. The invention relates particularly to protecting a secret key against attempts by an attacker to find out the secret key. Secret keys are used in authentication operations for example with smart cards, each smart card having an individual secret key for confirming its identity. The present invention is not, however, restricted only to smart cards, but the solution of the invention can be utilized also in other situations requiring the protection of a secret key. However, the invention will be described below by way of example with reference primarily to smart cards.

Previously known is a smart card comprising a memory, for example an EEPROM memory, in which a secret key is stored. The secret key is typically composed of a bit string having a length of no less than 64 bits. The smart card also comprises a processor. To confirm its identity, the smart card communicates with an external authentication process, whereby the authentication process feeds to the smart card an input composed of a bit string. The processor of the smart card then retrieves from the memory a secret key, which was stored therein in advance, and the processor then performs a calculation in accordance with a predetermined function using in the calculation the bit string fed to the smart card and the secret key retrieved from the memory. The smart card feeds the result of the calculation, i.e. the response, from its output to the authentication process.

Since the authentication process is aware of the smart card's secret key and of the function the smart card's processor uses, it is able to perform the same calculation as the smart card. If the result of the calculation performed by the authentication process corresponds to the result obtained from the output of the smart card, the identity of the smart card is confirmed, since only one smart card containing said secret key exists, which thus produces said response in response to the input that was fed thereto.

A weakness related to the above known smart card is that there are ways for an attacker to find out the secret key stored in the smart card's memory. One such way is DPA (Differential Power Analysis), in which different inputs are fed to the smart card repeatedly (several thousand times), and the response obtained from the output of the smart card, the power consumed by the smart card during the calculation, and the radiation generated by the smart card during the calculation are simultaneously monitored. By keeping statistics of the input, power consumption, radiation, and response, the attacker can find out the secret key stored in the card's memory. If an attacker finds out the secret key, he is able to for example clone the smart card, i.e. make another smart card in which the same secret key is stored. Such cloning may cause significant harm, for example if said smart card is a person's identity card by which the person can be electronically identified.

BRIEF SUMMARY OF THE INVENTION

It is an object of the present invention to avoid the above problem and to provide a solution for ensuring that an attacker cannot find out the secret key used for producing a response. This object is achieved by the method of the invention of producing a response with a device comprising an input for receiving an input; calculation means for producing a response which is responsive to the input and a secret key by utilizing a first predetermined function, and an output for feeding said response further. The method of the invention is characterized by storing in a memory of the device a key-specific number and a coded key, which is calculated by means of the secret key, the key-specific number and a second predetermined function, and, when producing the response, reading said key-specific number and coded key from the memory, calculating the secret key on the basis of said key-specific number and coded key by using the inverse function of said second predetermined function, and utilizing the calculated secret key to produce said response.

The invention also relates to a device for applying the method of the invention. The device of the invention comprises an input for receiving an input; calculation means for producing a response which is responsive to the input and a secret key by utilizing a first predetermined function, and an output for feeding said response further. The device of the invention is characterized by further comprising a memory for storing a key-specific number and a coded key, which is calculated by means of the secret key, the key-specific number and a second predetermined function, and means for retrieving the key-specific number and the coded key from the memory and feeding them to the calculation means, which calculate the secret key by means of the coded key, the key-specific number and the inverse function of said second predetermined function when producing said response.

The invention further relates to a system in which the method and device of the invention can be utilized. The system of the invention comprises a device having an input for receiving an input, calculation means for producing a response which is responsive to the input and a secret key by utilizing a first predetermined function, and an output for feeding said response further, and an apparatus, which is connected to the input of the device for feeding said input to the device, and to the output of the device for receiving said response, said apparatus further comprising a memory in which said secret key is stored, calculation means for calculating a check value by means of the input, the secret key and said first predetermined function, and means, which compare the response obtained from the output of the device with the check value and indicate if the response corresponds to the check value. The system of the invention is characterized in that the device further comprises a memory for storing the key-specific number and a coded key, which is calculated by means of the secret key, the key-specific number and a second predetermined function, and means for retrieving the key-specific number and the coded key from the memory and for feeding them to the calculation means, which calculate the secret key by means of the coded key, the key-specific number and the inverse function of said second predetermined function when producing said response.

The invention is based on the idea that finding out the secret key that produces the response becomes considerably more difficult when a key-specific number is read from the memory of the device upon production of the response and used in predetermined calculations for producing the response. This is because in this case the power consumption and radiation used in producing the response of the device are no longer solely dependent on the secret key, the input, and the function used in the calculation, but processing the key-specific number also generates a given measurable power consumption and radiation, which makes it still more difficult to find out the secret key. In this case, an attacker cannot be sure which part of the measurable power consumption and radiation is generated by processing the key-specific number and which part is generated by producing the actual response.

In accordance with the invention, the secret key is coded by using a second predetermined function and a key-specific number. In this case the coded key and the key-specific number are stored in the memory of the device. When the response is produced, the coded key and the key-specific number are read from the memory of the device, whereupon the inverse function of the second function is used to calculate the secret key used in producing the response. In this case the radiation and power consumption generated by calculating the secret key prevent an attacker from determining the radiation and power consumption generated in producing the response. Furthermore, the key is not at all stored in the memory of the device. Known solutions have shown that reading a secret key from a memory is an operation that supplies an attacker with a considerable amount of information.

Instead of the calculation means of the device utilizing a separate function and a separate secret key, it is also feasible that the secret key is part of the function used. In this case, for example changing the secret key actually means that the device-specific function is changed, and, similarly, finding out the secret key actually means that the secret device-specific function is figured out.

A key-specific number refers to a number that is in use substantially during the entire lifetime of the coded key. In other words, when a coded secret key is changed, the key-specific number is also changed. The key-specific number may be composed of for example a random number generated with a random number generator when the new coded secret key is taken into use. Alternatively, the key-specific number maybe composed of for example a pseudo random number. It is, however, important that a used key-specific number is not very often taken into use anew.

The most significant advantage of the solution of the invention is thus that an attacker finds it increasingly difficult to find out the secret key used in producing a response, since for example the power consumption and radiation of the device no longer correspond to the actual power consumption and radiation caused by producing the response, wherefore statistical methods are unable to find out the secret key being used.

In a preferred embodiment of the device of the invention, the device comprises means for calculating, at given intervals, for example when the device has produced 1000 responses, a new coded key by means of a new key-specific number and a second predetermined function. The device stores said new coded key and new key-specific number in its memory in place of the previous ones. This embodiment of the invention makes it still more difficult to find out the secret key, since an attacker is able to keep statistics of the radiation and power consumption during the production of, for example, said 1000 responses, whereupon an essential change occurs in the calculation operations carried out to produce the response, and the statistics are thus useless.

The preferred embodiments of the method, device and system of the invention are disclosed in the attached dependent claims 2, 3, 5, 7, and 8.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
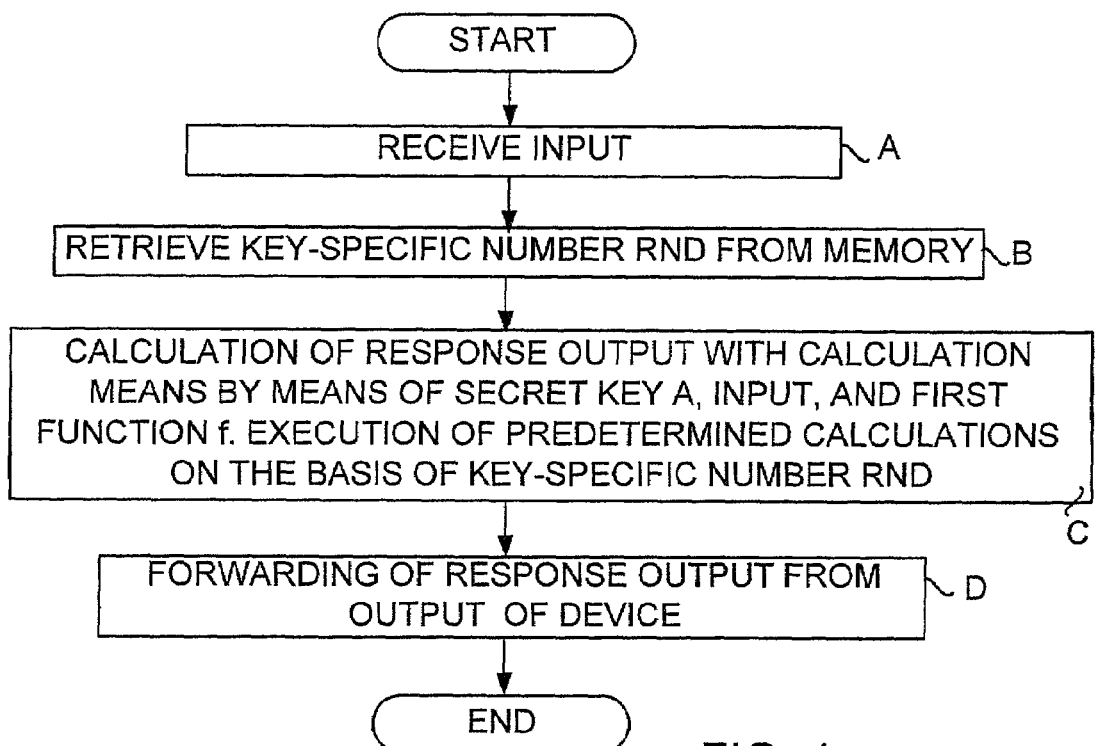
FIG. 1 is a flow chart of a first preferred embodiment of the method of the invention.

The flow diagram of FIG. 1 can be utilized for example for authenticating a smart card, i.e. it serves to ensure that a smart card is involved, which, in response to an input fed thereto, actually produces a predetermined response whose value depends on a smart card-specific secret key. A smart card-specific secret key means that of all the smart cards in use, only one uses said secret key when producing the response.

In FIG. 1, in block A, a given input INPUT is fed to the device, i.e. a smart card. In practice, said input is composed of a bit string of a predetermined length.

In block B, a key-specific number RND, stored in a memory of the device, is retrieved. It may be for example a random number that is determined and stored in the memory of the device at the same time as the secret key was determined for the smart card.

In block C, the response OUTPUT is calculated with calculation means utilizing a first function f by means of a secret key A and an input INPUT. During the calculation of the response, predetermined calculation operations are also carried out in block B on the basis of the read key-specific number RND.

If the secret key A is stored in the memory of the device, the calculation operations connected with the key-specific number RND are such that they have no effect on the response OUTPUT calculated by the calculation means. In other words, in this case a suitable calculation formula is used, whereby the energy consumption and radiation generated by the calculation only distort the total energy consumption and total radiation of the device when the response is produced.

If, on the contrary, the secret key A is not stored in the memory of the device, but instead, in addition to the key-specific number RND, a coded key A', calculated by utilizing the secret key A, the key-specific number RND and the second predetermined function g (i.e. A'=g(RND,A)) is stored in the memory of the device, the calculation operations associated with the key-specific number RND are such that they give as the result the secret key A. In this case, the inverse function g' of said second predetermined function g is used to calculate the secret key A on the basis of the key-specific number RND and the coded key A' (i.e. A=g'(RND,A')). Hereby the energy and radiation generated by calculating the key A distort the total energy consumption and total radiation generated in producing the response OUTPUT.

In block D, the response OUTPUT is fed from the output of the device. For example an external authentication apparatus can use the response to make sure that the right smart card is involved. This is accomplished by the authentication apparatus, which knows function f, the secret key A and the input INPUT, carrying out a calculation operation corresponding to that carried out by the smart card. Hereby the response OUTPUT produced by the smart card should be the same as the result of the calculation operation carried out by the authentication apparatus.

Figure 2:
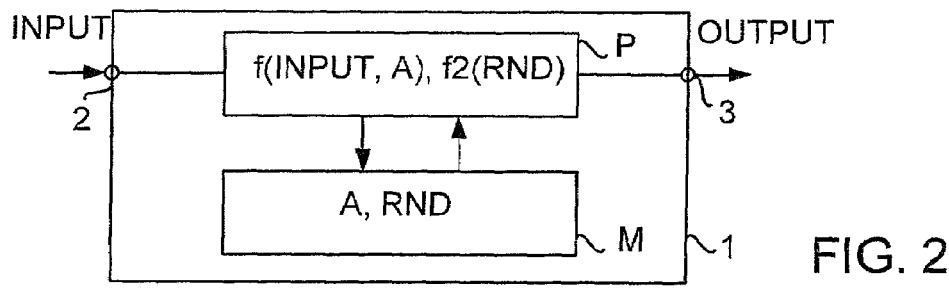
FIG. 2 is a block diagram of a first preferred embodiment of the device of the invention.

FIG. 2 is a block diagram of a first preferred embodiment of the device of the invention. The device in FIG. 2 can be for example an identity card by which a person's identity can be electronically confirmed; an electronic credit card, in whose memory is stored a given amount of money; a permit card, indicating to a satellite receiver connected to a TV set that it is allowed to watch a given subscription channel; or any other device that must be reliably authenticated.

The device 1 comprises a calculation means, composed of a processor P, which utilizes a given calculation function f. The device 1 also comprises a memory M, for example an EEPROM memory. In the memory M is stored the device's 1 secret key A, composed of a bit string whose length may be 64 bits, for example. In the memory M is also stored a key-specific number RND, also composed of a bit string.

When a given input INPUT is fed to the input 2 of the device 1, the processor P retrieves from the memory M the secret key A and the key-specific number RND stored therein. The processor P then uses the first predetermined function f to calculate the response OUTPUT, whose value depends on the secret key A and the input INPUT, i.e. OUTPUT=f(INPUT,A). When calculating the response OUTPUT, the processor P also carries out calculation by utilizing a function f2 and the key-specific number RND. The calculations carried out with function f2 do not affect the response OUTPUT produced by the processor, whereas the energy consumption in the calculation and the radiation caused by the calculation change, whereby it is impossible for an attacker to find out the energy required for producing the response OUTPUT and the radiation generated thereby.

In contrast to the case in FIG. 2, it is also feasible that the device 1 comprises two processors, one of which performs calculations on the basis of function f, and the second on the basis of function f2.

In the case of FIG. 2, when the processor P has completed the calculations with functions f and f2, it feeds the response OUTPUT generated by function f to the device's 1 output 3, from where an outside authentication process, for example, can read it.

Figure 3:
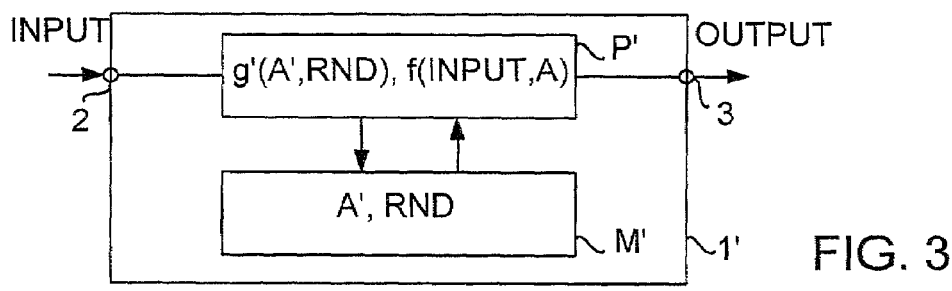
FIG. 3 is a block diagram of a second preferred embodiment of the device of the invention.

FIG. 3 is a block diagram of a second preferred embodiment of the device of the invention. The embodiment of FIG. 3 largely corresponds to that of FIG. 2. In the case of FIG. 3, however, a coded key A' is stored in the memory M' instead of the secret key A. Consequently, no secret key A is stored in the device 1', thus making it impossible to read the secret key from the memory at any time. Especially reading a secret key from a memory is such a measure that supplies an attacker with especially much information for finding out the secret key of the device.

In the case of FIG. 3, the coded key A' and the key-specific number RND are stored in the memory M' of the device 1'. The coded key A' has been generated by means of the secret key A and the key-specific number RND and a second predetermined function g such that A'=g(A,RND).

When the processor P' receives the input INPUT fed via the input 2 of the device 1', it retrieves the coded key A' and the key-specific number RND from the memory M'. The processor P' then utilizes the bit strings A' and RND retrieved from the memory in calculations to be performed on the basis of the inverse function g' of the second predetermined function g. As a result of these calculations, the processor P' finds out the secret key, i.e. A=g' (A',RND).

Once the processor knows the secret key A, it utilizes it in calculations to be performed on the basis of the first predetermined function f, the result of which is the response OUTPUT, i.e. OUTPUT=f(INPUT,A).

Calculating the secret key from the coded key and the key-specific number, brings about the advantage that the energy used by the device 1' to produce the response and the radiation generated thereby seem higher or lower than what they really are. An attacker is unable to distinguish the actual energy used in producing the response OUTPUT and the radiation generated thereby from other energy consumption and radiation.

It is naturally feasible, contrary to the case in FIG. 3, that the device comprises two processors, one of which performs the calculations by using function g', and the second by using function f.

Figure 4:
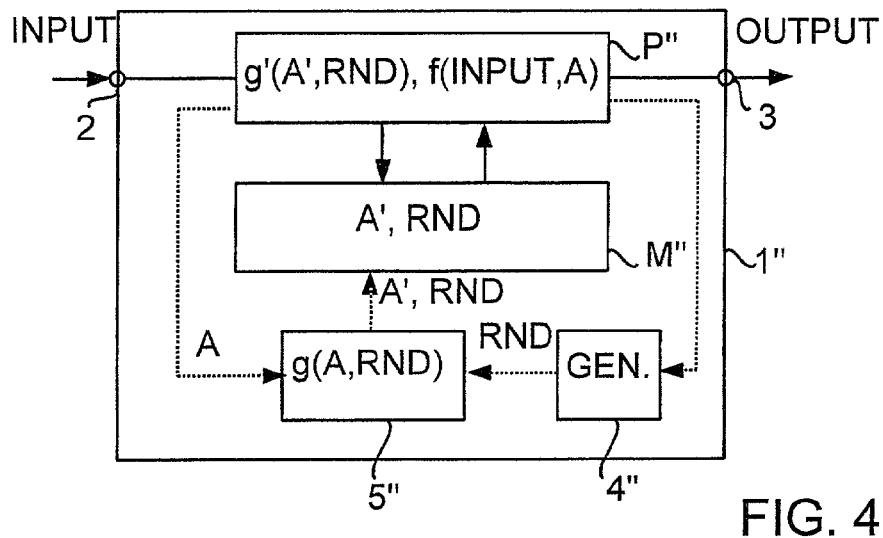
FIG. 4 is block diagram of a third preferred embodiment of the device of the invention.

FIG. 4 is a block diagram of a third preferred embodiment of the device of the invention. The embodiment of FIG. 4 largely corresponds to that of FIG. 3. In the case of FIG. 4, the device 1" comprises, however, means for taking into use a new coded key A' and a new key-specific number RND.

In the case of FIG. 4, the processor P" comprises a counter for registering the number of times the processor P" has produced the response OUTPUT. Once said counter reaches a predetermined limit value, e.g. 1000, the processor P" initiates a process for taking into use a new coded key A' and a new key-specific number RND. In this case the processor P" calculates the secret key A on the basis of the coded key A', the key-specific number RND and the function g', stored in the memory M". The processor P" feeds the secret key A thus obtained to a second processor 5" (contrary to the example in FIG. 4, the device 1" may also comprise a single processor, in which case the processor P" of FIG. 4 also performs the functions of the second processor 5" of FIG. 4). At the same time, the processor P" guides a random number generator 4" to generate a new random number, which the random number generator feeds to the second processor 5".

The second processor 5" is programmed to perform calculations by means of the second predetermined function g. Thus it calculates the new coded key A' on the basis of the secret key A and the new random number RND, whereby A'=g(A,RND). The processor 5" stores said new coded key A' together with a new key-specific number RND, composed of a random number, in the memory M" to replace the previous coded key and the previous key-specific code.

Lastly, the processor P" zeroes the counter, whereupon the device 1" utilizes the new coded key and the new key-specific number until the counter again indicates that the processor P" has produced a number of responses OUTPUT corresponding to the limit value (e.g. 1000), whereby the calculation of a new coded key again starts.

Figure 5:
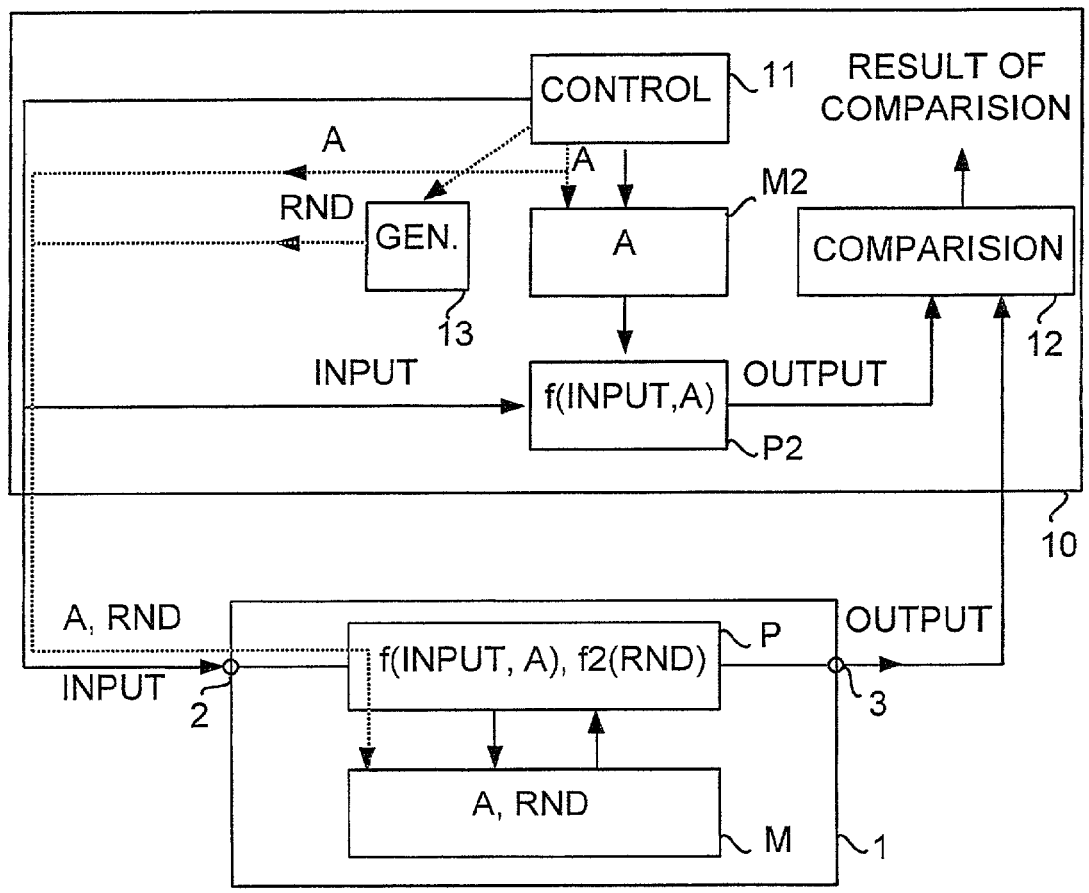
FIG. 5 is a block diagram of a first preferred embodiment of the system of the invention.

FIG. 5 is a block diagram of a first preferred embodiment of the system of the invention. The system of FIG. 5 utilizes the device 1 described in connection with FIG. 2.

The device 1 is connected to an apparatus 10, which may be for example an authentication apparatus. The device 1 and the apparatus 10 do not have to be physically interconnected, but the apparatus 10 may be for example a computer, which has a data transmission connection to the device 1 via the Internet or some other information network. If the device 1 is an electronic identity card inserted into the card reader of a computer connected to the Internet, the apparatus 10 is able to verify via the Internet and the device 1 the identity of the current user of the computer, the assumption being that the person concerned is the one whose identity card is at that time inserted into the reader.

The apparatus 10 comprises a memory M2 in which the secret keys of all available devices (identity cards) are stored. Consequently, when the apparatus wants to ensure that a given device 1 is concerned, it retrieves the secret key A of said device 1 from the memory M2 for authentication. Hereby a control unit 11 in the apparatus 10 also produces a predetermined input INPUT. The control unit 11 sends said input to the device 1 and to a processor P2 in the apparatus. The processor P2 in the apparatus uses the same function f as the processor P in the device 1. Since both processors use the same function f, the same secret key A and the same input INPUT, the response OUTPUT produced by them should also be the same. To ascertain this, the apparatus comprises a comparison means 12 that compares the response obtained from the output 3 of the device with the response produced by the processor P2, and, on the basis of the comparison, produces for example a signal that represents the result of the comparison.

The apparatus 10 may also be used to change the secret key of the device 1. In this case, the control unit 11 of the apparatus generates a new secret key A, which it stores in the memory M2 and transmits to the device 1. When the new secret key A is generated, a random number generator 13 in the apparatus 10 generates also a new key-specific number RND, which the apparatus also sends to the device 1. Thus the device 1 receives the new secret key A and the new key-specific number RND, which it stores in the memory M to replace the previous ones.

Figure 6:
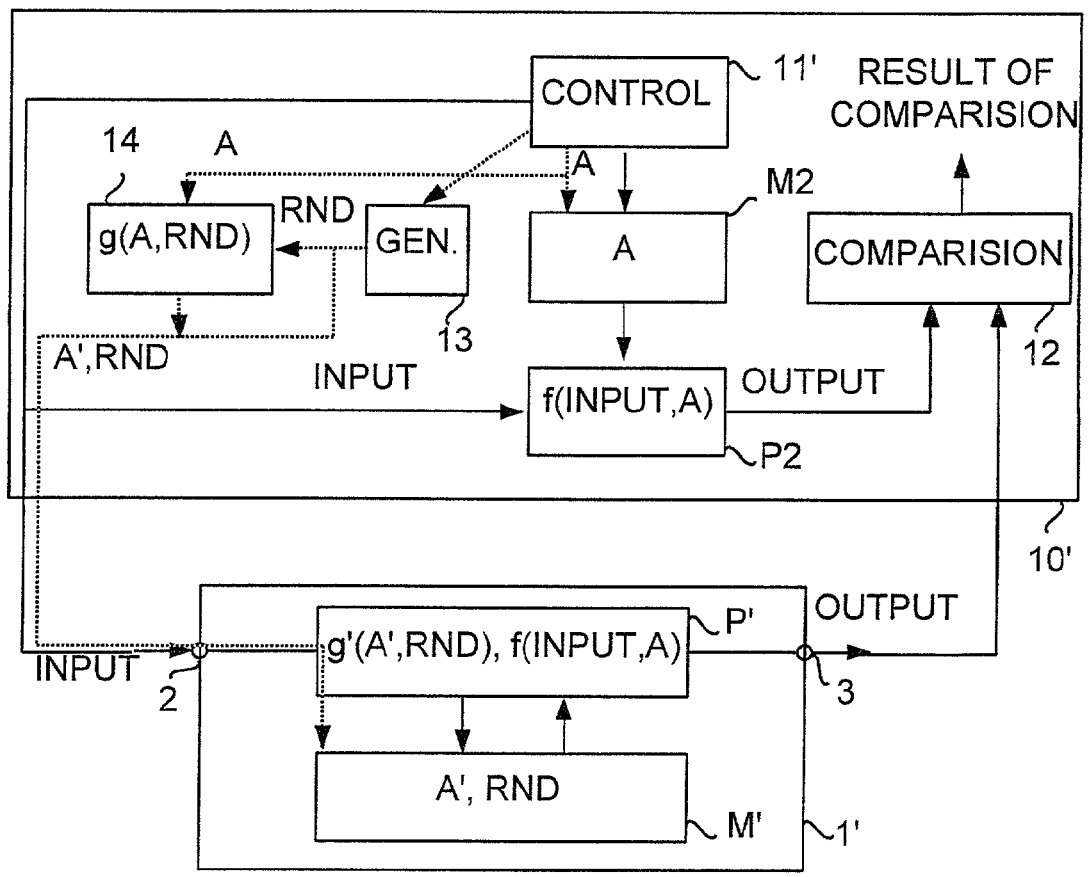
FIG. 6 is a block diagram of a second preferred embodiment of the system of the invention.

FIG. 6 is a block diagram of a second preferred embodiment of the system of the invention. The embodiment of FIG. 6 largely corresponds to that of FIG. 5.

In the embodiment of FIG. 6, the apparatus 10' does not, however, send a new secret key A to be stored in the memory of the device 1'. Instead, the new secret key A and the new key-specific number generated by the random number generator 13 are fed to a processor 14. The secret key A is also stored in the memory M2.

The processor 14 uses the second predetermined function g and the key-specific number to calculate the coded key A'. Hereby A'=g(RND,A). The device 10' then sends the new coded key A' and the key-specific number RND to the device 1', which stores them in the memory M'. The device 1' uses said coded key A' and the key-specific number RND as is described in connection with FIG. 3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of producing a response with a smart card, the smart card comprising:
    an input for receiving an INPUT;
    calculation means for producing a response which is responsive to the INPUT and a secret key by utilizing a first predetermined function; and
    an output for outputting said response;
    said method comprising:
    storing in a memory of the smart card a key-specific number and a coded key, which has been calculated using the secret key, the key-specific number and a second predetermined function; and,
    when producing the response:
    reading said key-specific number and said coded key from the memory of the smart card;
    calculating the secret key with the smart card using said key-specific number and said coded key by using the inverse function of said second pre-determined function; and
    utilizing the calculated secret key, the INPUT and the first predetermined function to produce said response with said smart card.

2. The method as claimed in claim 1, wherein said second predetermined function is a device-specific function, and that said key-specific number is a random number.

3. The method as claimed in claim 1 comprising calculating and storing in the memory of the smart card a new coded key and a new key-specific number, when the calculation means have utilized said first predetermined function a predetermined number of times.

4. A smart card comprising:
    an input for receiving an INPUT;
    calculation means for producing a response which is responsive to the INPUT and a secret key utilizing a first predetermined function;
    a memory for storing a key-specific number and a coded key, which has been calculated using the secret key, the key-specific number and a second predetermined function;
    means for retrieving the key-specific number and the coded key from the memory and feeding them to the calculation means, which calculates the secret key by means of the coded key, the key-specific number and the inverse function of said second predetermined function when producing said response; and
    an output for outputting said response.

5. The smart card as claimed in claim 4, wherein the smart card comprises coding means for calculating a new coded key by means of the secret key, a new key-specific number to be fed to the coding means, and said second predetermined function, and the smart card further comprises means for replacing the coded key and the key-specific number stored in the memory with the new coded key calculated by the coding means, and the new key-specific number.

6. A system comprising:
    a smart card having:
    an input for receiving an INPUT;
    calculation means for producing a response which is responsive to the INPUT and a secret key utilizing a first predetermined function;
    a memory for storing a key-specific number and a coded key, which is calculated using the secret key, the key-specific number and a second predetermined function;
    means for retrieving the key-specific number and the coded key from the memory and for feeding them to the calculation means, which calculates the secret key using the coded key, the key-specific number and the inverse function of said second predetermined function when producing said response; and an output for outputting said response; and an apparatus, connected to the input of the smart card for feeding said INPUT to the smart card, and to the output of the smart card for receiving said response, said apparatus comprising:

a memory for storing said secret key;

calculation means for calculating a check value by means of the INPUT, the secret key and said first predetermined function; and means, which compares the response obtained from the output of the smart card with the check value and indicates if the response corresponds to the check value.

7. The system as claimed in claim 6, wherein said apparatus comprises:

means for calculating the coded key by means of the secret key, the key-specific number and the second predetermined function; and means for storing the coded key and the key-specific number in the memory of the smart card.

8. The system as claimed in claim 7, wherein said apparatus further comprises a random number generator for generating the key-specific number during the calculation of the coded key.

* * * * *